(12) United States Patent  
Dodson (10) Patent No.: US 11,657,309 B2  
(45) Date of Patent: *May 23, 2023

(54) BEHAVIOR ANALYSIS AND VISUALIZATION FOR A COMPUTER INFRASTRUCTURE

(71) Applicant: Elasticsearch B.V., Mountain View, CA (US)

(72) Inventor: Stephen Dodson, London (GB)

(73) Assignee: Elasticsearch B.V., Amsterdam (NL)

( * ) Notice: Subject to any disclaimer, the term of this patent is extended or adjusted under 35 U.S.C. 154(b) by 950 days.

This patent is subject to a terminal disclaimer.

(21) Appl. No.: 16/424,127

(22) Filed: May 28, 2019

(65) Prior Publication Data

US 2019/0279098 A1 Sep. 12, 2019

Related U.S. Application Data

(63) Continuation of application No. 13/850,725, filed on Mar. 26, 2013, now Pat. No. 10,346,744.

(Continued)

(51) Int. Cl.
*G06N 7/00* (2023.01)
*G06N 20/00* (2019.01)
(Continued)

(52) U.S. Cl.
CPC ............... *G06N 7/00* (2013.01); *G06N 5/02* (2013.01); *G06N 20/00* (2019.01);
(Continued)

(58) Field of Classification Search
CPC .. G06F 11/1687; G06F 11/30; G06F 11/3051; G06F 11/3055; G06F 11/3089;
(Continued)

(56) References Cited

U.S. PATENT DOCUMENTS 5,347,540 A 9/1994 Karrick
5,437,163 A 8/1995 Jurewicz et al.
(Continued)

FOREIGN PATENT DOCUMENTS

CA 2766560 A1 * 8/2012 ............. G06F 17/18
EP 2645257 A2 10/2013
WO WO1999049474 A1 9/1999

OTHER PUBLICATIONS

Aharon, M. et al. (Sep. 2009). "One graph is worth a thousand logs: Uncovering hidden structures in massive system event logs". In Joint European Conference on Machine Learning and Knowledge Discovery in Databases (pp. 227-243). Springer Berlin Heidelberg. DOI: 10.1007/978-3-642-04180-8_32 (Year: 2009).*

(Continued)

*Primary Examiner* — Eric Nilsson
(74) *Attorney, Agent, or Firm* — Quinn IP Law (57) ABSTRACT

The field of the disclosure relates generally to a method and system for analyzing behavior of a computer infrastructure and the displaying the behavior of the computer infrastructure in a graphical manner. The system comprises an analytical engine connected to agents running on devices in the computer infrastructure and analyzing continuous data and asynchronous data.

13 Claims, 3 Drawing Sheets

Related U.S. Application Data (60) Provisional application No. 61/617,163, filed on Mar. 29, 2012.

(51) Int. Cl.

| | | |
|---|---|---|
| *G06N 5/02* | (2023.01) | |
| *G06F 11/34* | (2006.01) | |
| *G06F 11/30* | (2006.01) | |
| *G06F 11/32* | (2006.01) | |

(52) U.S. Cl.
CPC ........ *G06F 11/3055* (2013.01); *G06F 11/328* (2013.01); *G06F 11/3409* (2013.01); *G06F 11/3476* (2013.01); *G06F 11/3495* (2013.01)

(58) Field of Classification Search
CPC .......... G06F 11/32; G06N 7/00; G06N 20/00; G06N 5/02
See application file for complete search history.

(56) References Cited

U.S. PATENT DOCUMENTS

| | | | |
|---|---|---|---|
| 5,781,703 | A | 7/1998 | Desai et al. |
| 5,870,444 | A | 2/1999 | Mynett et al. |
| 6,026,348 | A | 2/2000 | Hala |
| 6,072,839 | A | 6/2000 | Mondal et al. |
| 6,216,063 | B1 | 4/2001 | Lind et al. |
| 6,594,275 | B1 | 7/2003 | Schneider |
| 6,611,537 | B1 | 8/2003 | Edens et al. |
| 6,694,462 | B1 | 2/2004 | Reiss et al. |
| 6,739,511 | B2 | 5/2004 | Tsikos et al. |
| 6,782,007 | B1 | 8/2004 | Redman |
| 6,901,582 | B1* | 5/2005 | Harrison ............... G06F 11/328 714/39 |
| 7,152,212 | B2 | 12/2006 | McMahan |
| 7,280,988 | B2 | 10/2007 | Helsper et al. |
| 7,451,148 | B2 | 11/2008 | Childress et al. |
| 7,451,210 | B2 | 11/2008 | Gupta et al. |
| 7,469,284 | B1 | 12/2008 | Dubrovsky et al. |
| 7,603,327 | B2 | 10/2009 | Esfahany |
| 7,739,689 | B1 | 6/2010 | Spertus et al. |
| 9,231,858 | B1 | 1/2016 | Greifeneder et al. |
| 10,346,744 | B2 | 7/2019 | Dodson |
| 2002/0022952 | A1 | 2/2002 | Zager et al. |
| 2003/0139905 | A1 | 7/2003 | Helsper et al. |
| 2003/0226071 | A1 | 12/2003 | Millar |
| 2004/0156317 | A1 | 8/2004 | Lund |
| 2005/0240396 | A1 | 10/2005 | Childs et al. |
| 2006/0020866 | A1 | 1/2006 | Lo et al. |
| 2006/0020924 | A1 | 1/2006 | Lo et al. |
| 2006/0091925 | A1 | 5/2006 | Desai et al. |
| 2006/0212487 | A1 | 9/2006 | Kennis et al. |
| 2007/0011135 | A1 | 1/2007 | Chitgupakar et al. |
| 2007/0028219 | A1 | 2/2007 | Miller et al. |
| 2007/0118491 | A1 | 5/2007 | Baum et al. |
| 2008/0120129 | A1 | 5/2008 | Seubert et al. |
| 2008/0208820 | A1 | 8/2008 | Usey et al. |
| 2008/0306711 | A1 | 12/2008 | Bansal |
| 2009/0070628 | A1* | 3/2009 | Gupta ............... G06F 11/3006 714/E11.029 |
| 2009/0249250 | A1 | 10/2009 | Gajula et al. |
| 2009/0307660 | A1 | 12/2009 | Srinivasan |
| 2010/0042573 | A1 | 2/2010 | Wenig et al. |
| 2010/0122175 | A1 | 5/2010 | Gupta et al. |
| 2011/0016160 | A1 | 1/2011 | Zhang |
| 2011/0145400 | A1 | 6/2011 | Dodson |
| 2011/0222669 | A1 | 9/2011 | Buriano et al. |
| 2011/0276396 | A1 | 11/2011 | Rathod |
| 2012/0179422 | A1 | 7/2012 | Webb et al. |
| 2012/0179809 | A1* | 7/2012 | Barsness ............... H04L 41/12 709/224 |
| 2013/0080641 | A1 | 3/2013 | Lui et al. |
| 2013/0262347 | A1 | 10/2013 | Dodson |
| 2013/0338543 | A1 | 12/2013 | Gegner et al. |
| 2013/0346519 | A1 | 12/2013 | Soundararajan et al. |

OTHER PUBLICATIONS

Cho, S. B. (2002). "Incorporating soft computing techniques into a probabilistic intrusion detection system". IEEE Transactions on Systems, Man, and Cybernetics, Part C (Applications and Reviews), 32(2), 154-160. (Year: 2002).*

Gama, J. (Jan. 13, 2012 online). "A survey on learning from data streams: current and future trends". Progress in Artificial Intelligence, 1(1), 45-55. DOI 10.1007/s13748-011-0002-6 (Year: 2012).*

Aharon, M. et al. (Sep. 2009) One Graph is worth a thousand logs: Uncovering hidden structures in massive system event logs. In Joint European Conference on Machine learning and Knowledge Discovery in Databses (pp. 227-243). Springer Berlin Heidelberg. DOI: 10.1007/978-3-642-04180_32.

Extended European Search Report dated May 19, 2014 in Application No. EP13160649.3, 7 pages.

Rinaldi et al., "Identifying, Understanding, and Analyzing Critical Infrastructure Interdependencies," IEEE Control Systems Magazine, Dec. 2001, pp. 11-25.

Hoke et al., "InteMon: Continuous Mining of Sensor Data in Large-scale Self-Infrastructures," ACM SIGOPS Operating Systems Review 40.3, 2006, pp. 38-44.

McGregor et al., "The NLANR network analysis infrastructure," Communications Magazine, IEEE 38.5, 2000, pp. 122-128.

"Stream" definition, Microsoft Computer Dictionary: Fifth Edition, Microsoft Press, 2002, p. 499.

"Data stream" definition, The Authoritative Dictionary of IEEE Standards Terms: Seventh Edition, IEEE Press, 2002, p. 273.

Jyothsna, V. et al., "A Review of Anomaly Based Intrusion Detection Systems," International Journal of Computer Applications, vol. 28, No. 7, Sep. 2011, pp. 26-35.

Xu, Xin, "Adaptive Intrusion Detection Based on Machine Learning: Feature Extraction, Classifier Construction and Sequential Pattern Prediction," International Journal of Web Services Practices, vol. 2, No. 1-2, 2006, pp. 49-58.

Cho, Sung-Bae, "Incorporating Soft Computing Techniques into a Probabilistic Intrusion Detection System," IEEE Transactions on Systems, Man, and Cybernetcs—Part C (Applications and Reviews), vol. 32, No. 2, May 2002, pp. 154-160.

Hulten, Geoff, et al., "Mining Time-Changing Data Streams," Proceedings of the Seventh ACM SIGKDD International Conference on Knowledge Discovery and Data Mining, Aug. 2001, pp. 97-106.

* cited by examiner

BEHAVIOR ANALYSIS AND VISUALIZATION FOR A COMPUTER INFRASTRUCTURE

CROSS-REFERENCE TO RELATED APPLICATIONS

The present application is a continuation of U.S. application Ser. No. 13/850,725, filed Mar. 26, 2013 which claims the benefit of U.S. Provisional Application Ser. No. 61/617,163 filed Mar. 29, 2012.

This application is also related to U.S. application Ser. No. 12/965,226, filed Dec. 10, 2010 (now U.S. Pat. No. 8,543,689, issued Sep. 24, 2013).

The foregoing cross-referenced applications are hereby incorporated by reference in their entirety.

FIELD

The present technology relates generally to a monitoring system for a computer infrastructure and to displaying of the behavior of the computer infrastructure.

BACKGROUND

Present-day computer infrastructures are very complex and a large numbers of processes, often called threads, as part of applications are running on a plurality of devices in the computer infrastructure. The processes organize data processing on the devices including fetching, processing and storage of data. Many industry sectors and large numbers of companies rely on these complex computer infrastructures for their operation. Therefore, failures of one or more of the devices or applications running on the devices, or even the whole of the computer infrastructure, could cause a great deal of damage and financial losses.

Time-critical and/or other important data, for example financial and business information, is received from external sources and processed or stored on the computer infrastructure. The malfunctioning of at least one of the devices or even the computer infrastructure itself should be minimized or at least be detected as soon as possible. Because current internal computer infrastructures, especially in connection with other external networks, such as the World Wide Web, have reached such a great complexity, a minor problem of the functionality of one of the devices may impact the performance of the whole computer infrastructure and may cause a system crash of other ones of the devices or even the whole computer infrastructure.

Currently, IT administrators conduct much of the forensic examination when problems on the devices in the computer infrastructure or in the applications running on the devices have already occurred by examining protocols or log files of past or recent running processes of the affected devices or applications. It could happen that one of the devices within the computer infrastructure malfunctions, such that one or more of the devices of the computer infrastructure would not receive or process all of the necessary data, or one or more of the devices of the computer infrastructure would not be able to process the data in a timely manner. This issue may cause erroneous or ineffective running of the applications within the computer infrastructure and may cause wrong decisions to be made within the company. This is particularly true if the decisions are made automatically by at least some of the devices of the computer infrastructure, such as but not limited to automated investment decisions made by computer devices of banks and financial institutions.

Computer analysis software for analyzing such possible malfunctions or causes of errors within the computer infrastructure is known in the art. An analyzing system of the prior art identifies, for example, different types of messages in connection with the running processes on the devices, such as servers, gateways or peripheral devices. Based on analyzing the different types of messages the analyzing system may estimate a recent functional status of the specific devices or of the computer infrastructure itself and thus identify the source of the malfunction.

Normally, the analyzing system will enable directly a diagnosis or a report of the possible source of the malfunction within the computer infrastructure to the IT-administrator, e.g. the affected application or device. Depending on the complexity of the current computer infrastructure, it is very often not possible or it is very difficult to diagnose or identify the malfunction within even parts of the computer infrastructure. The IT administrator may need to physically investigate, diagnose or identify the malfunction within at least parts of the computer infrastructure. In complex situations, the IT administrator may have to investigate many different running processes of the possibly affected parts of the computer infrastructure.

An example of an analyzing system is Splunk enterprise software that enables users to search, monitor and analyze data generated within the computer infrastructure. Splunk captures indices and correlates real-time data in a searchable repository. U.S. Patent Application Publication No. 2007/0118491 now issued as U.S. Pat. No. 7,937,344 issued May 3, 2011 (Baum et al, assigned to Splunk) describes such a system in more detail.

Co-pending U.S. application Ser. No. 12/965,226 (Dodson) (published as U.S. Patent Application Publication No. US 201110145400 A1, now U.S. Pat. No. 8,543,689 issued Sep. 24, 2013), discloses an apparatus comprising a plurality of devices connected to the computer infrastructure. An analytics engine is connected to the computer infrastructure and analyses system message data within the computer infrastructure to create a unified multi-dimensional model of the computer infrastructure. The analytics engine is able to create a background model of a repetitive operational behavior occurring within the computer infrastructure. The analytics engine is able to determine unexpected operational behavior occurring within the computer infrastructure that may be indicative of a possible malfunction within the computer infrastructure.

U.S. Pat. No. 7,451,210, issued Nov. 10, 2008 (IBM) discloses a method for predicting the occurrence of future critical events in a computer cluster having a series of nodes. The method records system performance parameters, such as temperature, central processing unit utilization time, processor number, user time, idle time, and input/output time, at predetermined intervals of time. The method also records the occurrence of past critical events, such as hardware or software errors or node failures, in the computer cluster. Time-series models and rule-based classification schemes are used to associate various system performance parameters with the occurrence of critical events and fed into a Bayesian network to predict the occurrence of future critical events in the computer cluster.

U.S. Pat. No. 7,280,988 issued Oct. 9, 2007 (Netuitive) teaches a monitoring system for a computer infrastructure. The monitoring system of the U.S. Pat. No. 7,280,988 includes a baseline model that automatically captures and models normal system behavior of the computer infrastructure. The monitoring system further includes a correlation model that employs a multivariate auto regression analysis to detect abnormal system behavior of the computer infrastructure, and an alarm service that processes and scores a variety of alerts to determine an alarm status and to implement appropriate response action for the computer infrastructure when a threshold value is reached. The baseline model decomposes input variables into a number of components representing relatively predictable behaviors so that the erratic component of the computer infrastructure may be isolated for further processing. Modelling and continually updating of the components of the computer infrastructure separately permits an accurate identification of the input variable, which typically reflects abnormal patterns when they occur.

The baseline model of the Netuitive monitoring system is updated on an on-going basis that allows the model to adapt to changes in the normal operational pattern of the computer infrastructure. The Netuitive monitoring system does not maintain a large database of historical analysis and does not enable a periodic revaluation of the historical data. The Netuitive monitoring system is able to establish an abnormal pattern and is able to present a list of events related to the abnormal pattern.

U.S. Patent Application Publication No. 2006/0020924 (U.S. patent application Ser. No. 11/152,966 filed Jun. 15, 2005, Lu and Chang) discloses a system, a method and a computer program product for monitoring performance of grouping of a computer infrastructure and applications using statistical analysis. The method, system and computer program monitors managed unit groupings of executing software applications and execution infrastructure to detect deviations in performance of the computer infrastructure. Logic acquires time-series data from at least one managed unit grouping of the executing software applications and the execution infrastructure. Other logic derives a statistical description of expected behavior from an initial set of acquired data. The logic derives a statistical description of operating behavior from the acquired data that corresponds to a defined moving window of time slots. The logic compares the statistical description of expected behavior with the description of operating behavior and the logic reports predictive triggers. The logic identifies instances in which the statistical description of the operating behavior deviates from the statistical description of the operating behavior of the computer infrastructure to indicate a statistically significant probability letting operating anomaly exist within the at least one managed unit grouping corresponding to the acquired time period data.

SUMMARY

The present disclosure teaches a system and method for analyzing a behavior within a computer infrastructure. The computer infrastructure comprises a number of devices, such as but not limited to, computers, servers, clients, (web-based) terminals, gateways, routers and/or other multifunctional devices, such as printers or scanners. The computer infrastructure may be an intra-network within a company environment or a cloud-based network. At least one device is connected to the computer infrastructure and the device can generate continuous data and asynchronous data related to system and application parameters for a log file about the behavior of the device. At least one analytics engine analyzes at least one of the continuous data and the asynchronous data to determine the behavior of the computer infrastructure. A display indicates the type of behavior determined. For example, the display can indicate abnormal types of behavior identified by the analytics engine and can indicate a possible negative impact within the computer infrastructure.

The term "abnormal" used in this present disclosure means a deviation from the expected recent and/or expected future performance of at least one device, one application and/or the computer infrastructure. A possible deviation of the recent and/or future functionally of the computer infrastructure in comparison with a multi-dimensional model of the computer infrastructure is expected to be an abnormal performance, which may have a negative impact on at least one device of the computer infrastructure. The detection of abnormal messages within the computer infrastructure, such as a shutdown-message of at least one device and/or performance deviations above a certain threshold of at least one device are expected to be abnormal performances within the computer infrastructure.

The present disclosure also teaches a system and method for the visualization of behavior within a computer infrastructure using the analytics engine.

According to an aspect of the present disclosure there is provided a computer program product which, when run on a computer, causes the computer to perform a method for analyzing the behavior within the computer infrastructure. According to a further aspect of the present disclosure there is provided a non-volatile storage medium for storing the computer program product.

According to another aspect of the present disclosure there is provided a computer program product which, when run on a computer, causes the computer to perform a method for visualization of the behavior within the computer infrastructure. According to a further aspect of the present disclosure there is provided a non-volatile storage medium for storing the computer program product.

The present disclosure enables the functionality and performance of the computer infrastructure and/or at least of one device to be visualized in an intuitive way. The teachings of the present disclosure allow the displaying of the analyzed behavior of at least one device or the computer infrastructure itself. An IT administrator could detect easily abnormal behaviors, such as possible malfunctions or under-performances of at least one of the devices and/or within the computer infrastructure, by investigating the display of grouped graphic elements related to performances of devices and/or the computer infrastructure. This helps to avoid expensive and time-consuming data mining by the IT administrator within a plurality of messages as an indicator for the performances of at least one device and/or the computer infrastructure itself.

The analytics engine determines relationships among the continuous data and the asynchronous data within the computer infrastructure to determine thus the behavior of the computer infrastructure.

Graphic elements are linked to the relationships within the computer infrastructure and are visualized on a display. The graphic elements help the IT administrator in an easy and intuitive way to analyze at least the relationships, especially in case of abnormal behavior. The graphic elements may vary in relation to detected abnormal types of behaviors. In this case the IT administrator could view in an easy and quick way possible abnormal functionalities, malfunctions and abnormal performances of at least one device or of computer infrastructure. Further, at least some of the graphic elements are selectable for opening directly the related types of system parameters and the log file data entries within the computer infrastructure. According to this aspect of the invention, the IT administrator could select directly and intuitively the relevant graphic element and therefore obtain at least one of the related information. According to the present disclosure, a time-consuming manually data mining of the IT administrator for finding the relevant messages or log data related to the abnormal performance within the computer infrastructure is reduced.

In a further aspect of the invention, the analytics engine groups the types of relationships within the computer infrastructure and the grouping is represented by the grouping of related graphic elements. The possible relationships are displayed by grouping the relevant graphic elements in a related way. The analytics engine is a self-learning system, which identifies patterns in system parameters via statistical methods such as multivariate Gaussian analysis, and patterns across the log files and system parameters via probabilistic modelling. By using self-learning systems it is possible that new pattern of the graphic elements could be initially identified as being abnormal behavior and over time be identified as normal running processes of at least one device or the computer infrastructure. It is also possible to obtain an initial behavior of the computer infrastructure by taking existing data and using the self-learning system to establish the initial pattern.

In another aspect, the computer infrastructure is connectable with a data source transferring the data to the computer infrastructure via an interface and the interface transforms different formats and/or protocols of data between the data source and the computer infrastructure.

In a further aspect, the behavior of the computer infrastructure is compared with an index and the analytics engine determines possible relationships between the behavior of the computer infrastructure and the index. The index may be, for example, the VIX index of the Chicago Board Options Exchange, which is a measure of the implied volatility of the S&P Standard & Poor's 500 index. It is possible to determine the relationship between the performance of processing financial data on one or more computer infrastructures of market participants and the VIX index. The VIX index is often referred to as the fear index as it represents one measure of the market's expectation of stock market volatility over the forthcoming thirty-day period.

DETAILED DESCRIPTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
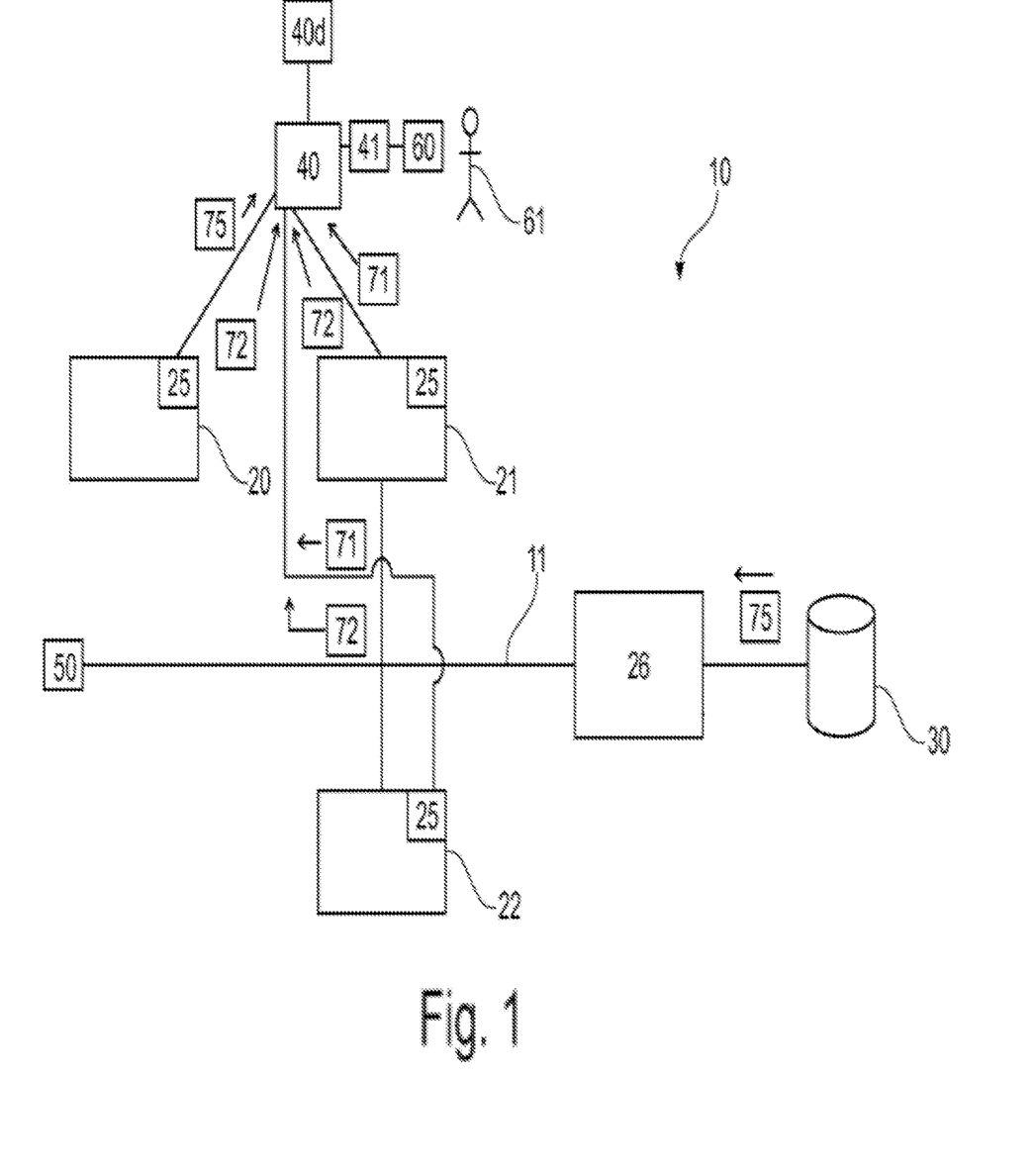
FIG. 1 is a schematic diagram showing three networked user terminals within a computer infrastructure.

FIG. 1 shows a computer infrastructure 10 with three devices 20, 21, 22, a management system 40 with database 40d, an analytics engine 41 and an administrator terminal 60 connected with an external data source 30 through a web server 26. The external data source 30 sends data to the one or more devices 20, 21, 22 for processing by applications programs running on the one or more devices 20, 21, 22 through the web server 26. The transfer of data and the processing by applications programs produces asynchronous data 71 in the form of events, traps, log messages or other notifications when changes happen in the applications programs and/or on the devices 20, 21, 22, and continuous data 72 relating, for example, to CPU processing, access time or memory usage of the devices 20, 21 and 22.

The one or more devices 20, 21, 22 include agents 25 (also termed forwarders) which are monitoring and collecting the asynchronous data as well as the continuous data on the devices 20, 21 and 22. The agents 25 forward the asynchronous data 71 as well as the continuous data 72 to the management system 40. Non-limiting examples of the management system 40 include Splunk and CA's Introscope APM system.

The management system 40 aggregates the asynchronous data 71 and the continuous data 72 from multiple ones of the devices 20, 21, 22. In the example of FIG. 1 the management system 40 is shown as a single management system 40 connected to the other devices 20, 21 and 22 within the computer infrastructure 10. The management system 40 could also be a series of similar or different management systems 40 distributed throughout the computer infrastructure 10. The series of the management systems 40 can be commonly analyzed by the analytics engine 41.

The devices 20, 21 and 22 can directly process the data from the external data source 30 as well as other generated data through application programs running thereon, or can instruct another processor to run said application programs, such as a server 50. It will be appreciated that the computer infrastructure 10 may include database servers and file servers. The analytics engine 41 is generally implemented as a computer program stored in a non-volatile medium and running on a general purpose computer.

The analytics engine 41 interrogates entries in the management system database 40d storing the asynchronous data 71 and synchronous (continuous) data 72 and is able to analyze the performance of the computer infrastructure 10 based on the database entries stored on the management system database 40d. The relationship between the different database entries in the management system database 40d including associated time stamps are used to monitor the performance of the devices 20, 21, 22 and the computer infrastructure 10.

In the exemplary aspect of FIG. 1 the asynchronous data 71 and the synchronous (continuous) data 72 from the devices 20, 21, 22 are analyzed and their relationships determined. This analysis enables the behavior of the computer infrastructure 10 to be determined and displayed as graphic elements 90, 91, 92, 93 (shown in FIGS. 2 and 3) in a display on the administrator terminal 60 (or elsewhere).

The external data source 30 may contain business and financial data 75 and information, such as information of the information provider Thomson Reuters. It will be appreciated that there may be more than one external data source 30 connected to the computer infrastructure 10.

The analytics engine 41 uses the database entries of the management system database 40d to determine patterns and relationships between the various types of asynchronous data, the various types of continuous data and between each types of data. This determination is carried out substantially in real time. In one aspect of the disclosure, a multivariate Gaussian analysis is used to determine these patterns and relationships.

The initial relationships can be established either by analysis of historical data stored in the management system database 40*d* or by using the current (real-time) generated data in the computer infrastructure 10. Initially the analytics engine 41 will not recognize any relationships and may report abnormal behavior. After time, the analytics engine 41 will recognize recurrent patters or behaviors and not report these recurrent patterns or behaviors as being abnormal.

The analytics engine 41 uses these relationships to determine size, shape and/or color of the graphic elements 90, 91, 92, 93 (shown in FIGS. 2 and 3), which are transferred to the display on the administrator terminal 60. An IT administrator 61 can monitor the performance of the computer infrastructure 10 by intuitively analyzing the graphic elements 90, 91, 92, 93 and the relationship between the graphic elements 90, 91, 92, 93 in relation to the size, shape and/or color of the different graphic elements 90, 91, 92, 93.

In one aspect of the disclosure, the analytics engine 41 has the capabilities to determine or simulate probabilities of certain streams of the log files data 71 of at least one of the devices 20, 21 or 22 of the computer infrastructure 10 for providing a forecast of the possible future performance of the device 20, 21 or 22, of the computer infrastructure 10.

Additionally, a possible future performance of the device 20, 21 or 22 of the computer infrastructure 10 may be simulated by the analytics engine 41 based on past and/or recent performance logs combined with the current system parameters of the computer infrastructure 10.

Figure 2:
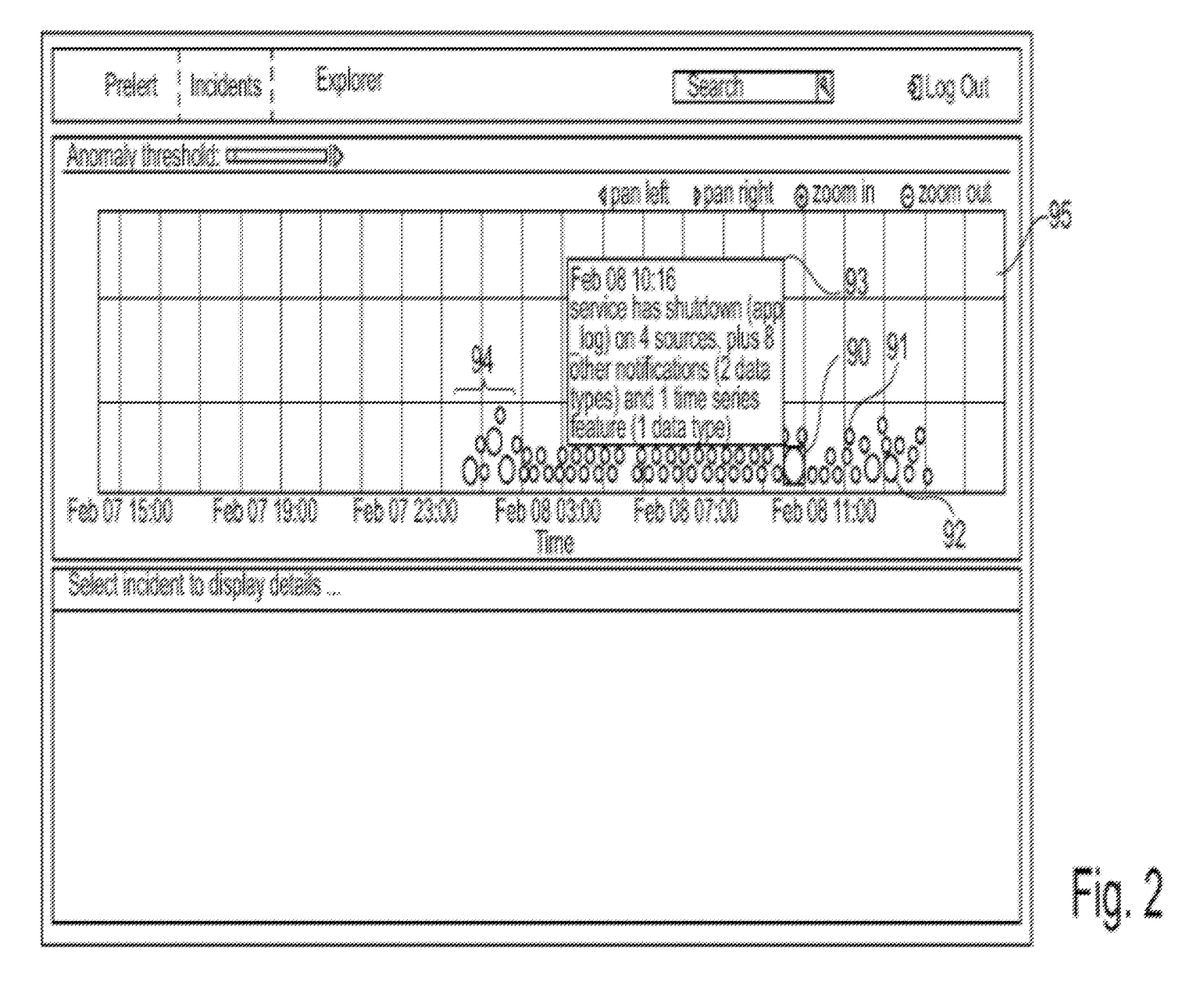
FIG. 2 shows a display of graphic elements related to analyzed types of messages.
Figure 3:
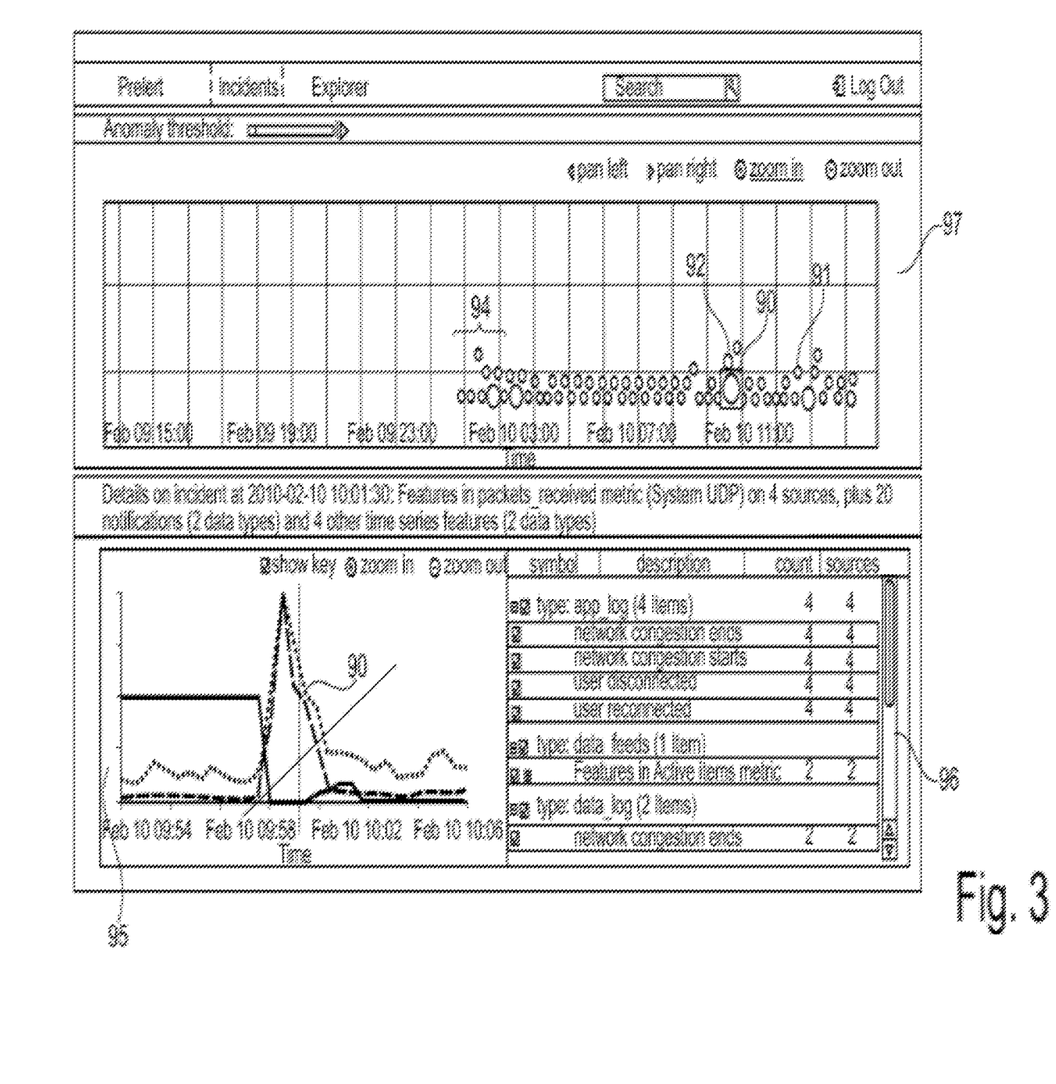
FIG. 3 shows a display of graphic elements related to analyzed types of messages within different panes.

The graphic elements 90, 91, 92 shown in FIGS. 2 and 3 relate to the relationships between the database entries in the management system database 40*d*. The graphic elements 90, 91 and 92 are linked to the relationships determined between the system parameters and the database entries in the management system database 40*d*. The analytics engine 41 may group related graphic elements 90, 91 and 92 on the display to identify visually related ones of the behaviors.

Deviations from a normal behavior to give an abnormal behavior may be detected by the analytics engine 41 using the regression analysis disclosed above.

The relationship between the performance of the computer infrastructure 10 and an index, for example the VIX index which is the Chicago board of options exchange market volatility index, can also be analyzed by the analytics engine 41. The VIX index is a measure of the implied volatility of the S&P Standard & Poor's 500 index options. The VIX index is often referred to as the fear index or the fear gauge as it represents one measure of the market's expectation of stock market volatility over the forthcoming thirty-day period. The analytics engine 41 determines the correlation between the entries in the management system database 40*d* of at least one device 20,21 or 22 the computer infrastructure 10 or even different computer infrastructures 10 of different market participants and the volatility x in order to understand the drivers and the levers of the market participants.

The continuous data 72 is supplied to the management system 40 in a discrete form. For example, the values of the continuous data 72 could be supplied as a value at a particular point in time or as an average value of a period of time. The value of the continuous data 72 could also be provided to the management system database 40*d* only if a certain threshold value is reached. The associated time stamp will usually be provided to indicate the time at which the value of the continuous data 72 was recorded.

Examples of the continuous data 72 issued at 15 s intervals:

| timestamp | user_cpu_% | system_cpu_% | udp_packets_sent | udp_packet_recv | udp_recv_errors | disk_kB_read | disk_kB_wrtn |
|---|---|---|---|---|---|---|---|
| 1269817200 | 0.04 | 0.08 | 76455031 | 92774447 | 37237 | 168659806 | 1602388429 |
| 1269817215 | 0.07 | 0.18 | 76456531 | 92778887 | 37237 | 168659806 | 1602391693 |
| 1269817230 | 3.00 | 7.28 | 76457432 | 92781254 | 37237 | 168659806 | 1602393765 |
| 1269817245 | 0.00 | 0.47 | 76461859 | 92783865 | 37237 | 168661623 | 1602396709 |

An example of the asynchronous data 71 are log file messages:

Nov 2 04:17:25 10.1.71.20 security[success] ANONYMOUS LOGON NT AUTHORITY (0x1,0x46E2DC55) 3
Nov 2 04:19:51 10.1.71.20 security[success] (0x1, 0x46E2DCBD) 3 NtLmSsp NTLM ITDV1005137 . . . 10.1.71.19 0
Nov 2 04:20:54 10.1.71.20 security[success] (0x1, 0x46E2DCCA) 3 NtLmSsp NTLM ITDV1005137 . . . 10.1.71.19 0
Nov 2 05:18:38 155.108.27.78 vmkernel: 346:22:33:18.284 cpu3:1041)BC: 814: FileIO failed with 0x0xbad0006 (Limit exceeded)

FIG. 2 shows graphic elements 90, 91, 92 arranged on a time scale within a pane 95 on the display 60. The graphic elements 90, 91, 92 are grouped to display possible relationships between behaviors of the computer infrastructure 10. The shape, size and color of the graphic elements 90, 91, 92 indicate a possible impact of the behavior or the behavior type on the performance of the computer infrastructure 10. The graphic elements 90, 91, 92 may be displayed in connection with a single one or a set of the devices 20, 21 or 22 or for the entirety of the computer infrastructure 10. Additionally, status messages and notifications 93 may be displayed in the pane 95 to inform the IT administrator 60 about background information about the displayed graphic element 90, 91, 92. It will be appreciated that at least one of the graphic elements 90, 91, 92 is selectable and directly linked to the continuous data 72 and/or the asynchronous data 71 in the management system 40, and information thereabout.

FIG. 3 shows three different panes 95, 96, 97 with different graphic elements 90, 91,92. The top pane 97 displays the relationship 94 between different graphic elements 90, 91, 92 on a time scale. According to this mode of presentation of the graphic elements 90, 91, 92 the IT administrator 61 may detect and analyze abnormal behaviors, such as malfunctions and underperformances in an easy and intuitive way because of the shape, size and/or color of the graphic elements 90, 91, 92 and their relative arrangement on the time scale. Within the other panes 95, 96 a similar time scale is visualized and additional information and/or other graphic elements 90, 91, 92, for example visualized as a graph 90 within pane 95, may be displayed.

Having thus described the present invention in detail, it is to be understood that the foregoing detailed description of the invention is not intended to limit the scope of the invention. One of ordinary skill in the art would recognize other variants, modifications and alternatives in light of the foregoing discussion.

What is desired to be protected by letters patent is set forth in the following claims.

What is claimed is:

1. A method for analyzing behavior of a computer infrastructure, the method comprising:
   monitoring and collecting continuous data on at least one device of a computer infrastructure by at least one agent associated with the at least one device, the continuous data comprises system parameters regarding the at least one device;
   monitoring and collecting asynchronous data, by the at least one agent, when changes happen on the at least one device of the computer infrastructure, the asynchronous data including at least log file data of the at least one device;
   executing a self-learning process comprising:
      probabilistically modelling behaviors of the computer infrastructure using the continuous data and the asynchronous data in real-time;
      identifying patterns in the probabilistically modeled behaviors via one or more statistical methods over time that includes analyzing relationships between the continuous data and the asynchronous data to detect a behavior type, of a plurality of behavior types, of at least one component of the computer infrastructure; and
      identifying abnormal behaviors based on the identified patterns; and
   initiating displaying of an indication indicative of the detected behavior type as graphic elements, at least one of the graphic elements being linked to the continuous data and the asynchronous data;
   initiating display of an indication of a degree of impact of the detected behavior type on the computer infrastructure, wherein the graphic elements have different colors or shapes in relation to the degree of impact of the detected behavior type on the computer infrastructure, wherein at least a portion of the graphic elements are selectable, and in response to a selection of at least a portion of the graphic elements, opening related types of the system parameters and the log file data of the continuous data and asynchronous data within the computer infrastructure;
   determining or simulating probabilities of certain streams of the log file data of the at least one device of the computer infrastructure; and
   providing a forecast of possible future performance of the at least one device of the computer infrastructure based on the determination or simulation.

2. The method of claim 1, wherein the probabilistically modelling identifies patterns across the log file data and the system parameters.

3. The method of claim 1, wherein the one or more statistical methods identify patterns in the system parameters of the computer infrastructure.

4. The method of claim 3, wherein the one or more statistical methods includes multivariate Gaussian analysis.

5. The method of claim 1, further comprising linking at least some of the graphic elements to relationships determined between the system parameters and the log file data.

6. The method of claim 1, wherein the system parameters include central processing unit (CPU) processing, access time, and/or memory usage.

7. The method of claim 1, wherein the self-learning process initially identifies a first one of the behaviors as being abnormal behavior.

8. The method of claim 7, wherein the self-learning process, in response to identifying a particular pattern, changes the identification of the first one of the behaviors from the abnormal behavior to a normal running process of the at least one device of the computer infrastructure.

9. The method of claim 1, wherein the self-learning process uses stored previously collected asynchronous and continuous data to establish an initial pattern to obtain an initial behavior of the computer infrastructure.

10. A system for visualization of behavior within a computer infrastructure, the system comprising:
    at least one agent associated with at least one device of a computer infrastructure for monitoring and collecting continuous data on the at least one device, the continuous data comprises system parameters regarding the at least one device;
    the at least one agent further for monitoring and collecting asynchronous data when changes happen on the at least one device of the computer infrastructure, the asynchronous data including at least log file data of the at least one device of the computer infrastructure; and
    an analytics engine configured for:
       probabilistically modelling behaviors of computer infrastructure using the continuous data and the asynchronous data in real-time;
       identifying patterns in the probabilistically modeled behaviors via one or more statistical methods over time that includes analyzing relationships between the continuous data and asynchronous data to detect a behavior type, of a plurality of behavior types, of at least one component of the computer infrastructure;
       identifying abnormal behaviors based on the identified patterns;
       initiating displaying of an indication indicative of the detected behavior type as graphic elements, at least one of the graphic elements being linked to the continuous data and the asynchronous data;
       initiating a degree of impact of the detected behavior type, wherein the graphic elements have different colors or shapes in relation to the degree of impact of the detected behavior type, wherein at least a portion of the graphic elements are selectable, and in response to a selection of at least a portion of the graphic elements, opening related types of the system parameters and the log file data of the continuous data and asynchronous data within the computer infrastructure;
       determining or simulating probabilities of certain streams of the log file data of the at least one device of the computer infrastructure; and
       providing a forecast of possible future performance of the at least one device of the computer infrastructure based on the determination or simulation.

11. The system of claim 10, wherein the analytics engine is a self-learning system.

12. The system of claim 10, wherein the computer infrastructure is connectable with a data source for reception of data via a server and the server transfers data between the data source and the computer infrastructure.

13. A computer-readable program having a plurality of non-transitory instructions stored on a non-volatile medium which, when executed on a processor, causes the computer program to:

to monitor and collect continuous data on at least one device of a computer infrastructure by at least one agent associated with the at least one device, the continuous data comprises system parameters regarding the at least one device;

to monitor and collect asynchronous data when changes happen on the at least one device of the computer infrastructure by at least one agent associated with the at least one device, the asynchronous data including at least log file data of the at least one device of the computer infrastructure;

to execute a self-learning process, the self-learning process comprising:

probabilistically modelling behaviors of computer infrastructure using the continuous data and the asynchronous data in real-time;

identifying patterns in the probabilistically modeled behaviors via one or more statistical methods over time that includes analyzing relationships between the continuous data and the asynchronous data to detect a behavior type, of a plurality of behavior types, of at least one component of the computer infrastructure; and identifying abnormal behaviors based on the identified patterns;

to initiate displaying of an indication indicative of the behavior type as graphic elements, at least one of the graphic elements being linked to the continuous data and the asynchronous data;

to initiate displaying a degree of impact of the detected behavior type on the computer infrastructure, wherein the graphic elements have different colors or shapes in relation to the degree of impact of the detected behavior type on the computer infrastructure, wherein at least a portion of the graphic elements are selectable, and in response to a selection of at least a portion of the graphic elements, opening related types of the system parameters and the log file data of the continuous data and asynchronous data within the computer infrastructure;

to determine or simulate probabilities of certain streams of the log file data of the at least one device of the computer infrastructure; and to provide a forecast of possible future performance of the at least one device of the computer infrastructure based on the determination or simulation.

\* \* \* \* \*